United States Patent
Watanabe

(10) Patent No.: US 9,503,564 B2
(45) Date of Patent: Nov. 22, 2016

(54) COMMUNICATION DEVICE, CONTROL METHOD OF COMMUNICATION DEVICE, AND PROGRAM

(71) Applicant: NEC CASIO Mobile Communications, Ltd., Kanagawa (JP)

(72) Inventor: Osamu Watanabe, Kanagawa (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 14/399,741

(22) PCT Filed: Jan. 7, 2013

(86) PCT No.: PCT/JP2013/050012
§ 371 (c)(1),
(2) Date: Nov. 7, 2014

(87) PCT Pub. No.: WO2013/190854
PCT Pub. Date: Dec. 27, 2013

(65) Prior Publication Data
US 2015/0133198 A1    May 14, 2015

(30) Foreign Application Priority Data
Jun. 20, 2012    (JP) ................. 2012-138744

(51) Int. Cl.
*H04M 1/725* (2006.01)
*H04M 1/02* (2006.01)
*H04M 3/02* (2006.01)

(52) U.S. Cl.
CPC ....... *H04M 1/72561* (2013.01); *H04M 1/0256* (2013.01); *H04M 1/72519* (2013.01); *H04M 1/72563* (2013.01); *H04M 3/02* (2013.01); *H04M 2250/16* (2013.01)

(58) Field of Classification Search
CPC ......... H04M 1/72561; H04M 1/0256; H04M 1/72519; H04M 1/72563; H04M 3/02; H04M 2250/16
See application file for complete search history.

(56) References Cited

U.S. PATENT DOCUMENTS 8,923,934 B2    12/2014    Chol et al.
2010/0064536 A1*    3/2010    Caskey ............... G06F 1/1616
                                                            33/303

(Continued)

FOREIGN PATENT DOCUMENTS

CN    102469183    5/2012
JP    2005-217817    8/2005

(Continued)

OTHER PUBLICATIONS

International Search Report, PCT/JP2013/050012, Feb. 12, 2013.

(Continued)

*Primary Examiner* — Mehmood B Khan
(74) *Attorney, Agent, or Firm* — Young & Thompson

(57) ABSTRACT

A communication device includes: a first unit that is provided with a first display unit, a transmitter unit, and a receiver unit, a second unit that is detachably attached to the first unit and that is provided with a second display unit; an input unit; a communication unit that transmits a voice signal from the transmitter unit to a communication partner and that inputs to the receiver unit a voice signal from the communication partner; a detection unit that detects whether the first and second unit are in a separated state; and a control unit that executes an application, displays images that correspond to the execution of the application on the first and second display units, and when voice call is to be carried out, and moreover, when the detection result indicates that the first and second unit are in the separated state, displays images on the second display unit.

6 Claims, 8 Drawing Sheets

(56) References Cited

U.S. PATENT DOCUMENTS

| | | |
|---|---|---|
| 2010/0227642 A1 | 9/2010 | Kim |
| 2011/0143769 A1 | 6/2011 | Jones |
| 2011/0216064 A1* | 9/2011 | Dahl .................. G06F 1/1616 345/428 |
| 2013/0169545 A1* | 7/2013 | Eaton .................. H04M 1/0241 345/173 |

FOREIGN PATENT DOCUMENTS

| | | | |
|---|---|---|---|
| JP | 2008-263622 | * | 10/2008 |
| JP | 2009-164861 | | 7/2009 |
| JP | 2011-101124 | | 5/2011 |
| JP | 2011-166534 | * | 8/2011 |
| WO | WO2006/051669 | | 5/2006 |

OTHER PUBLICATIONS

F-04B User's Manual (Jun. 1, 2012 search) Internet <http://www.nttdoconno.co.jp/support/trouble/manual/download/fo4b/index.html.

Chinese Office Action dated Mar. 7, 2016 in corresponding Chinese Patent Application No. 201380032272.3.

Extended European Search Report (EESR) dated Mar. 1, 2016; Application No. 13806406.8.

* cited by examiner

Fig.7
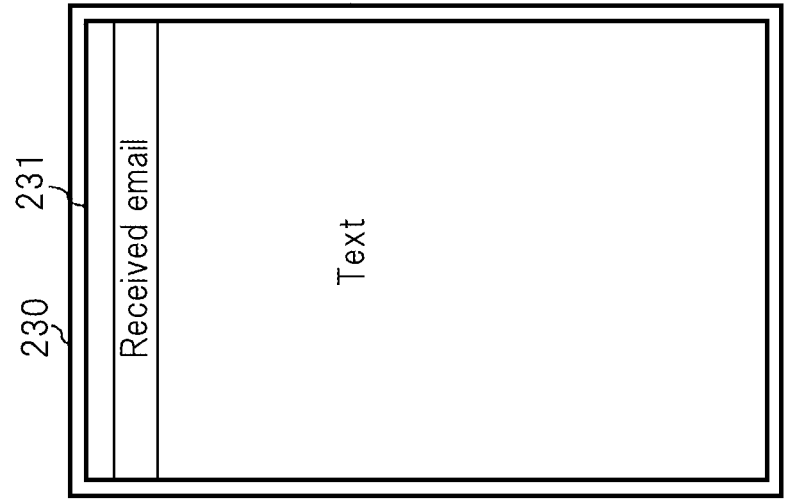
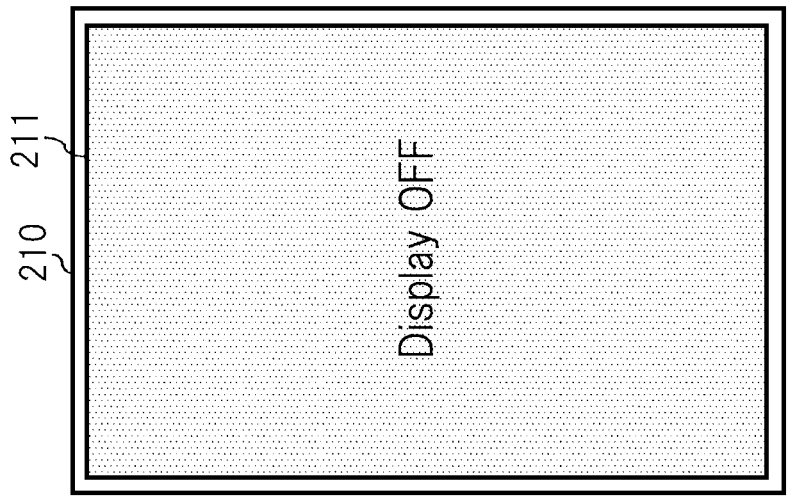

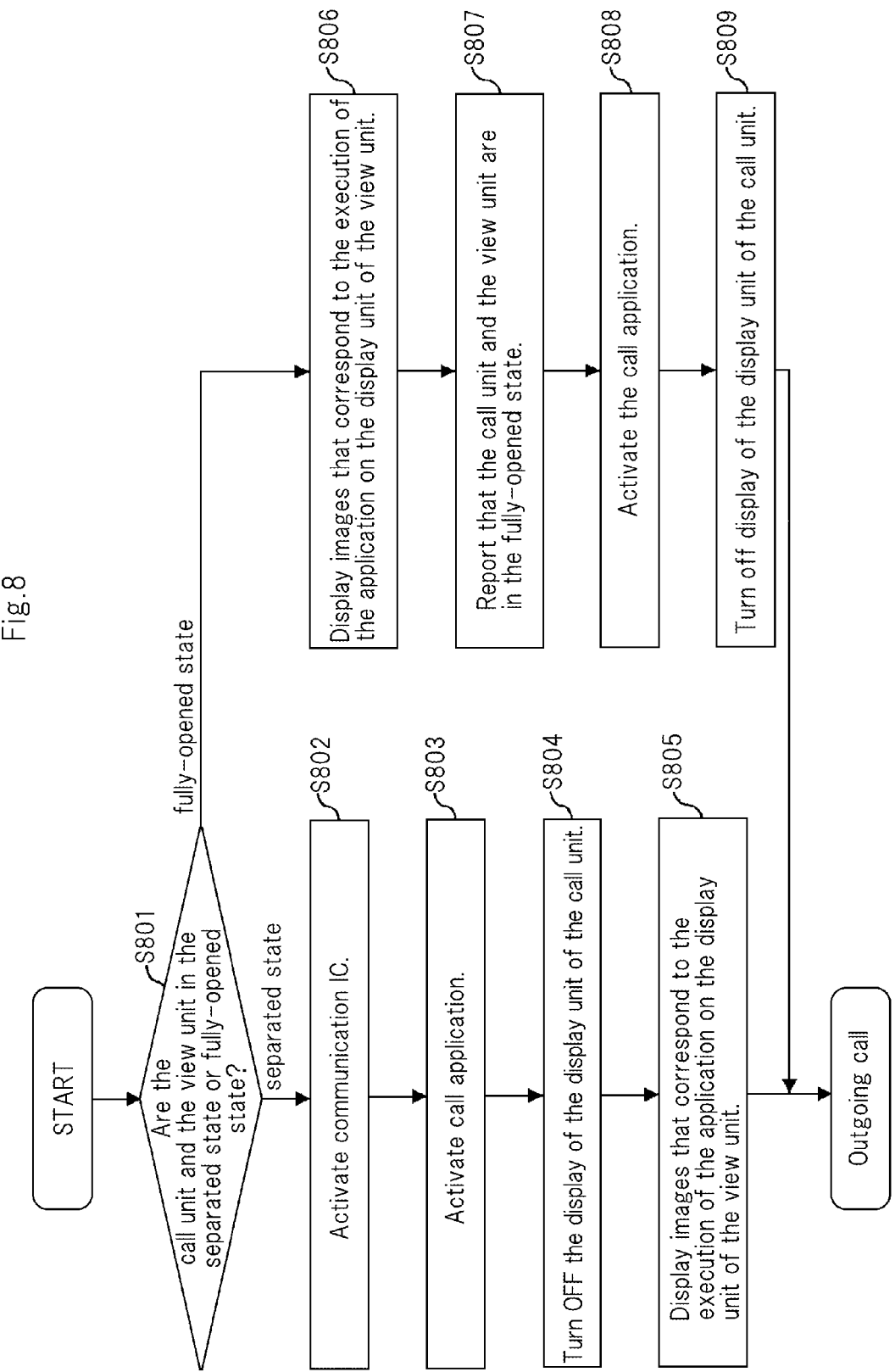

COMMUNICATION DEVICE, CONTROL METHOD OF COMMUNICATION DEVICE, AND PROGRAM

TECHNICAL FIELD

The present invention relates to a separate-type communication device, a control method of the communication device, and a program.

BACKGROUND ART

Communication devices such as mobile telephones and smartphones have a great variety of configurations. Configurations include, for example, the so-called straight-type configuration that is composed of one case (unit) in which a display unit and an input unit for receiving operation input are provided on the same surface, and the so-called folding-type configuration in which a first unit provided with a display unit and a second unit provided with an input unit are joined by way of a hinge so as to allow opening and closing.

Patent Document 1 (WO 2006/051669 A1) discloses a sliding-type communication device in which a first unit provided with a first display unit and a second unit provided with a second display unit are joined so as to allow sliding.

In addition, Non-Patent Document 1 discloses the so-called separate-type communication device that is equipped with a first unit provided with a display unit and a second unit that is detachably attached to the first unit and that is provided with a transceiver unit for carrying out voice call.

When a user carries out voice call by use of a communication device, the user holds the communication device in a state with the speaker in the communication device is in proximity to the user's ear. In this state, the user is unable to view the display of the display unit in the above-described straight, folding, or sliding types of communication devices. Thus, when the user wishes to, for example, carry out voice call while viewing a Web page, the ease of use of the device is compromised because, even though the Web page is being displayed on the display unit, the user is unable to carry out voice call while looking at the display unless the user uses, for example, a headset.

In contrast, according to the separate-type communication device disclosed in Non-Patent Document 1, at the time of voice call, the user separates the first unit and second unit and then holds the second unit for carrying out voice call and holds the first unit such that the display of the display unit can be easily seen, whereby the display of the display unit can be easily viewed and the ease of use during voice call is improved.

RELATED ART DOCUMENTS

Patent Documents

Patent Document 1: WO 2006/051669 A1

Non-Patent Documents

Non-Patent Document 1: "F-04B User's Manual" (Jun. 1, 2012 search) Internet <http://www.nttdocomo.co.jp/support/trouble/manual/download/fo4b/index.html>

SUMMARY OF THE INVENTION

Problem to be Solved by the Invention

The communication device disclosed in Non-Patent Document 1 has the problem that, being equipped with only one display unit, it becomes difficult to view the display when a large amount of information is to be viewed at one time. Because a communication device such as a mobile telephone or smartphone is normally carried by the user and the device size is limited, the size of the display unit is therefore limited. As a result, it is difficult to remedy this problem by increasing the size of the display unit.

An object of the present invention is to provide a communication device, a control method of the communication device, and a program that facilitate viewing the display of a display unit and thus improve the ease of use during voice call.

Means for Solving the Problem

In order to achieve the above object, a communication device according to the present invention is equipped with a first unit and a second unit that is detachably attached to the first unit and that is able to communicate with the first unit;

the first unit being provided with at least a first display unit, a transmitter unit that outputs a voice signal of an input voice, and a receiver unit that reproduces an input voice signal;

the second unit being provided with at least a second display unit;

the communication device comprising:

an input unit that accepts operation input;

a communication unit that, upon receiving input indicating that voice call is to be carried out, transmits a voice signal that is output by the transmitter unit to a communication partner by way of a network and inputs to the receiver unit a voice signal from the communication partner that is received by way of the network;

a detection unit that detects whether or not the first unit and the second unit are in a separated state; and a control unit that executes an application in accordance with input by way of the input unit, and when not carrying out voice call, displays images that correspond to the execution of the application on the first and second display units, and when having received input indicating that voice call is to be carried out, and moreover, when the detection result of the detection unit indicates that the first unit and the second unit are in the separated state, displays images that correspond to the execution of the application on the second display unit.

In order to achieve the above object, a control method of a communication device of the present invention is the control method of a communication device that is equipped with a first unit that is provided with at least a first display unit, a transmitter unit that outputs a voice signal of an input voice, and a receiver unit that reproduces an input voice signal and a second unit that is provided with at least a second display unit, that is detachably attached to the first unit, and that is able to communicate with the first unit; comprising:

upon receiving input indicating that voice call is to be carried out, transmitting a voice signal that is output from the transmitter unit to a communication partner by way of a network and inputting to the receiver unit a voice signal from the communication partner that is received by way of the network;

detecting whether or not the first unit and the second unit are in a separated state; and executing an application in accordance with operation input, and when not carrying out voice call, displaying images that correspond to the execution of the application on the first and second display units, and upon receiving input indicating that voice call is to be carried out, and moreover, when the first unit and the second unit are in the separated state, displaying images that correspond to the execution of the application on the second display unit.

In order to achieve the above object, a program of the present invention causes a computer in a communication device, which is equipped with a first unit that is provided with at least a first display unit, a transmitter unit that outputs a voice signal of an input voice, and a receiver unit that reproduces an input voice signal; and a second unit that is provided with at least a second display unit, that is detachably attached to the first unit, and that is able to communicate with the first unit; to execute:

a process of, upon receiving input indicating that voice call is to be carried out, transmitting a voice signal that is output from the transmitter unit to a communication partner by way of a network and inputting to the receiver unit a voice signal from the communication partner that is received by way of the network;

a process of detecting whether or not the first unit and the second unit are in a separated state; and a process of executing an application in accordance with operation input, and when not carrying out voice call, displaying images that correspond to the execution of the application on the first and second display units, and upon receiving input indicating that voice call is to be carried out, and moreover, when the first unit and the second unit are in the separated state, displaying images that correspond to the execution of the application on the second display unit.

According to the present invention, it is possible to facilitate viewing the display of a display unit and to improve the ease of use during voice call.

BRIEF DESCRIPTION OF THE DRAWINGS

FIG. 5 is a flow chart showing the operation at the time of an incoming call of the communication device shown in FIG. 3

FIG. 7 shows an example of the display state of the display unit shown in FIG. 3.

FIG. 8 is a flow chart showing the operation at the time of outgoing call of the communication device shown in FIG. 3.

EXEMPLARY EMBODIMENTS

Exemplary embodiments for carrying out the present invention are next described with reference to the accompanying drawings.

First Exemplary Embodiment

Figure 1:
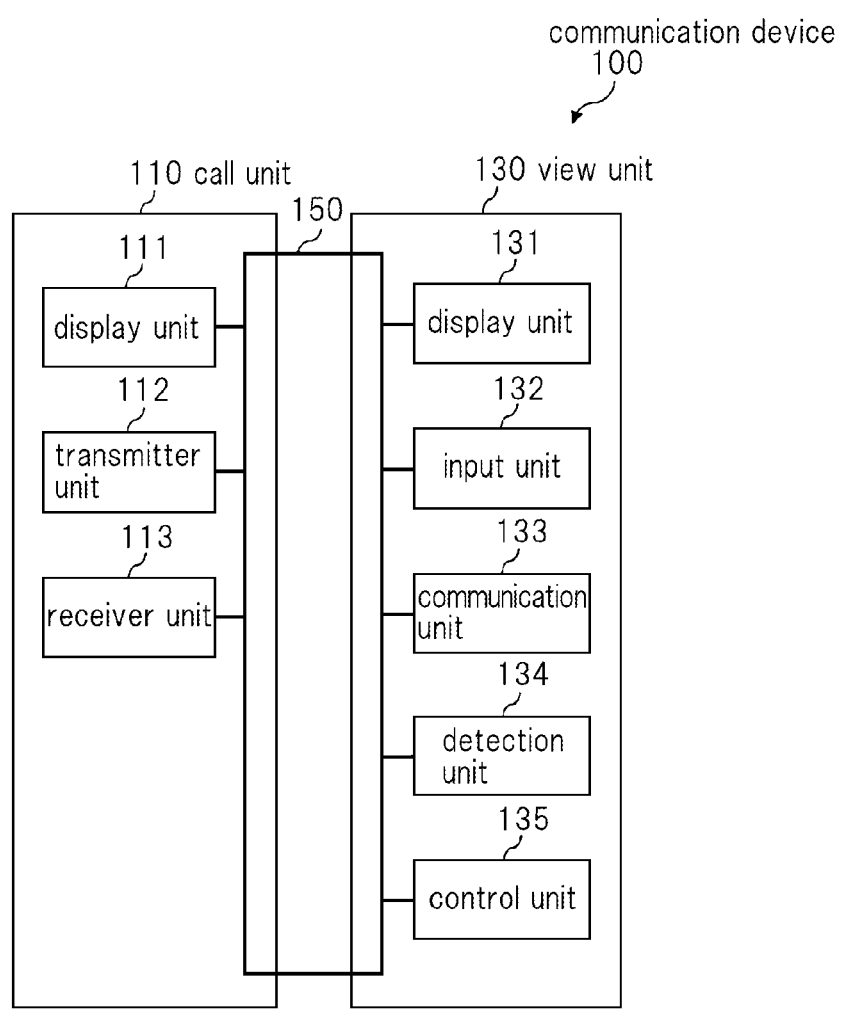
FIG. 1 is a block diagram showing the essential configuration of the communication device of the first exemplary embodiment of the present invention.

FIG. 1 is a block diagram showing the essential configuration of communication device 100 of the first exemplary embodiment of the present invention. The communication device according to the present invention is equipped with communication functions for carrying out, for example, an outgoing call function and incoming call function, transmission and reception of email, and access to the Internet. Specific examples of communication device 100 include a mobile telephone, a smartphone, a tablet or notebook personal computer, a portable game device, and a PDA (Personal Digital Assistant).

Communication device 100 is the so-called separate-type communication device that is equipped with call unit 110, and view unit 130 that is detachably attached to call unit 110. Call unit 110 is an example of the first unit, and view unit 130 is an example of the second unit.

Call unit 110 includes display unit 111, transmitter unit 112, and receiver unit 113. View unit 130 includes display unit 131, input unit 132, communication unit 133, detection unit 134, and control unit 135. Display unit 111 is an example of the first display unit, and display unit 133 is an example of the second display unit.

In a state in which call unit 110 and view unit 130 are linked, the components in call unit 110 and in view unit 130 are each connected together by way of bus 150. In a state in which call unit 110 and view unit 130 are separated, each of the components in call unit 110 are connected together by way of bus 150, and each of the components in view unit 130 are connected together by way of bus 150. In addition, call unit 110 and view unit 130 are capable of short-range wireless communication when in the separated state. In FIG. 1, description of the configuration for carrying out short-range wireless communication has been omitted.

Display unit 111 is, for example, an LCD (Liquid Crystal Display) and displays images under the control of control unit 135.

Transmitter unit 112 is, for example, a microphone and outputs a voice signal of an input voice.

Receiver unit 113 is, for example, a speaker and reproduces an input voice signal.

Display unit 131 is, for example, an LCD and displays images under the control of control unit 135.

Input unit 132 accepts operation input from the user. Specific examples of input unit 132 include key buttons or a touch pad that detects contact with or proximity of, for example, a finger or a stylus pen. When input unit 132 is a touch pad, the touch panel is constructed by being overlaid on display unit 131.

Input unit 132 may also be provided on call unit 110, and may be provided on both call unit 110 and view unit 130.

Communication unit 133 can communicate by way of a network, and upon receiving input indicating that voice call is to be carried out, transmits a voice signal that is output from transmitter unit 112 to the communication partner by way of the network, and inputs to receiver unit 113 the voice signal from the communication partner that is received by way of the network. The input and output of voice signals between communication unit 133 and transmitter unit 112 and receiver unit 113 are carried out by way of bus 150 when call unit 110 and view unit 130 are in the linked state and are carried out by way of short-range wireless communication when call unit 110 and view unit 130 are in the separated state.

In addition, communication unit 133 carries out, for example, the transmission and reception of email and the transmission and reception of data necessary for browsing Web pages by way of a network in accordance with input by way of input unit 132. Communication unit 133 may also be provided in call unit 110.

Detection unit 134 detects whether or not call unit 110 and view unit 130 are in the linked state and outputs the detection result. Detection unit 134 may also be provided in call unit 110.

Control unit 135 executes an application in accordance with input by way of input unit 132, and when voice call is not being carried out, displays images that correspond to the execution of the application on display unit 111 and display unit 131. Upon receiving input by way of input unit 132 indicating that voice call is to be carried out, and moreover, when the detection result of detection unit 134 indicates that call unit 110 and view unit 130 are in the separated state, control unit 135 displays images that correspond to the execution of the application on display unit 131.

Control unit 135 may also be provided in call unit 110, and may also be provided separately in call unit 110 and view unit 130.

Next, the operation of communication device 100 of the present exemplary embodiment is described.

Figure 2:
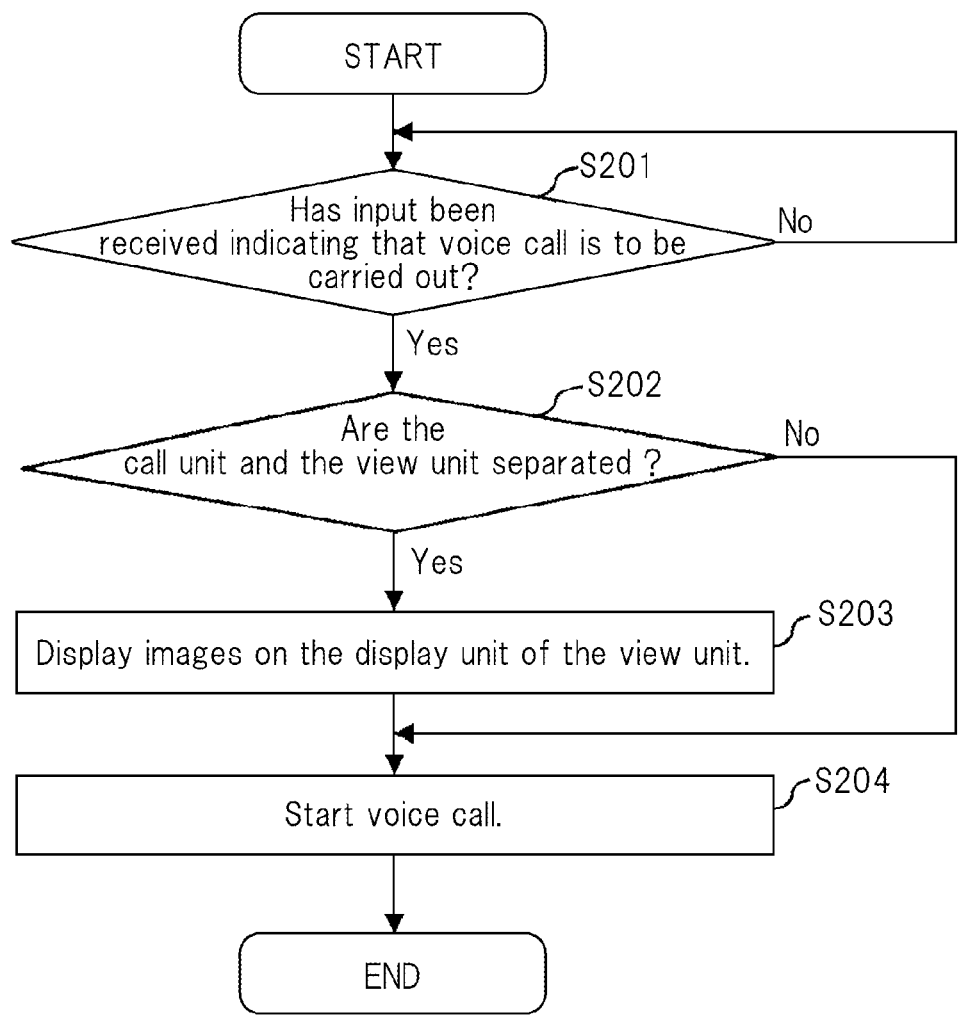
FIG. 2 is a flow chart showing the display control operations of the communication device shown in FIG. 1.

FIG. 2 is a flow chart showing the display control operations during voice call.

Control unit 135 is assumed to be executing an application and bringing about the display of images that correspond to the execution of the application on display unit 111 and display unit 131.

Control unit 135 judges whether or not input has been received indicating that voice call is to be carried out (indicating that an outgoing call is to be carried out, or indicating that a response is to be made to an incoming call) (Step S201).

If input is not received indicating that voice call is to be carried out (Step S201: No), control unit 135 repeats the process of Step S201.

When input is received indicating that voice call is to be carried out (Step S201: Yes), control unit 135 judges whether or not call unit 110 and view unit 130 are in the separated state based on the detection result of detection unit 134 (Step S202).

If call unit 110 and view unit 130 are in the separated state (Step S202: Yes), control unit 135 brings about display of images that correspond to the execution of the application on display unit 131 of view unit 130 (Step S203).

Next, control unit 135 starts the voice call on communication unit 133 (Step S204).

On the other hand, if call unit 110 and view unit 130 are not in the separated state (Step S202: No), control unit 135 proceeds to the process of Step S204. If call unit 110 and view unit 130 are not in the separated state, the display of one or both of display units 111 and 131 may be turned OFF.

Thus, according to the present exemplary embodiment, communication device 100 is equipped with call unit 110 that includes display unit 111 and view unit 130 that is detachably attached to call unit 110 and that includes display unit 131; and when not carrying out voice call, causes display of images that correspond to the execution of an application on display unit 111 and display unit 131, and upon receiving input indicating that voice call is to be carried out, and moreover, when call unit 110 and view unit 130 are in the separated state, causes display of images that correspond to the execution of the application on display unit 131.

As a result, when voice call is not carried out, images that correspond to the execution of an application are displayed on two display units, whereby more information can be more visibly displayed. In addition, upon receiving input indicating that voice call is to be carried out, and moreover, when call unit 110 and view unit 130 are in the separated state, images that correspond to the execution of the application are displayed on display unit 131 of view unit 130. By separating call unit 110 and view unit 130, the user is able to hold view unit 130 in a state that allows easy viewing of the display of display unit 131, whereby the display of the display unit can be easily viewed even during voice call.

Second Exemplary Embodiment

Figure 3:
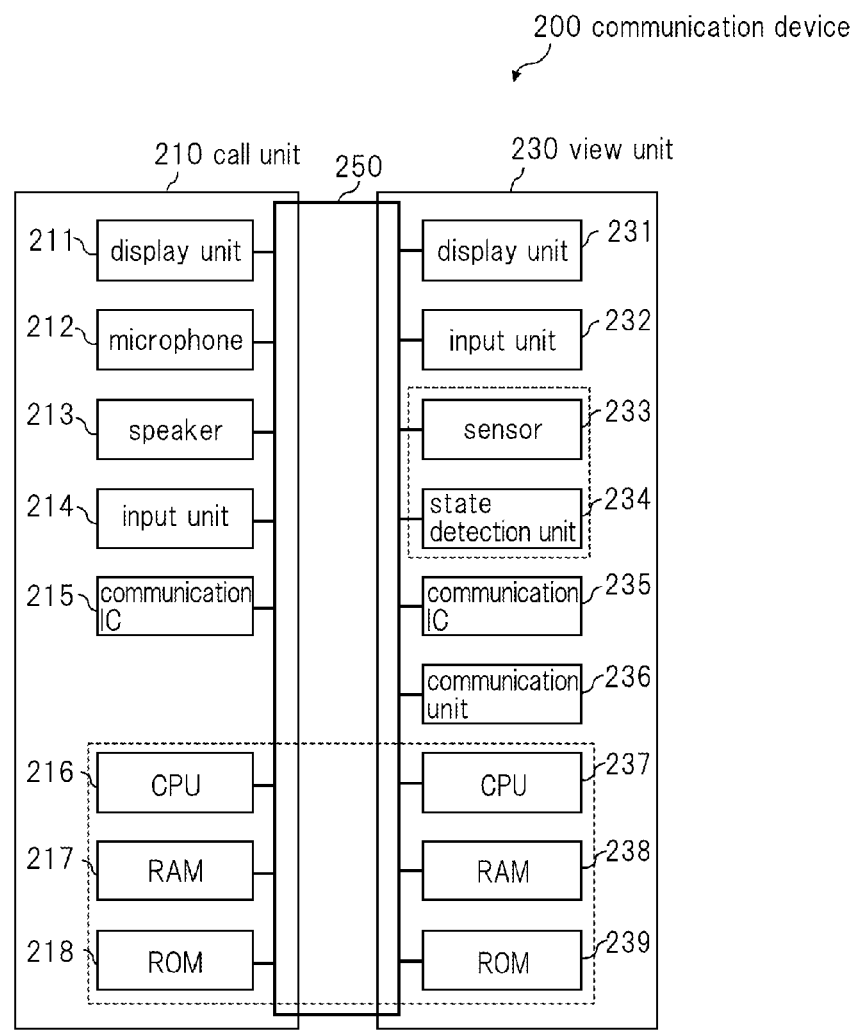
FIG. 3 is a block diagram showing the essential configuration of the communication device of the second exemplary embodiment of the present invention.

FIG. 3 is a block diagram showing the essential configuration of communication device 200 of the second exemplary embodiment of the present invention.

Communication device 200 is the so-called separate-type communication device that is equipped with call unit 210 and view unit 230 that is detachably attached to call unit 210. In addition, in the linked state, call unit 210 and view unit 230 are linked so as to allow opening and closing. Call unit 210 is one example of the first unit, and view unit 230 is one example of the second unit.

Call unit 210 includes display unit 211, microphone 212, speaker 213, input unit 214, communication IC (Integrated Circuit) 215, CPU (Central Processing Unit) 216, RAM (Random Access Memory) 217, and ROM (Read Only Memory) 218.

View unit 230 includes display unit 231, input unit 232, sensor 233, state detection unit 234, communication IC 235, communication unit 236, CPU 237, RAM 238, and ROM 239.

Display unit 211 is an example of the first display unit, and display unit 231 is an example of the second display unit. In addition, microphone 212 is an example of the transmitter unit, and the speaker is an example of the receiver unit. Sensor 233 and state detection unit 234 make up the detection unit. In addition, CPU 216, RAM 217, ROM 218, CPU 237, RAM 238, and ROM 239 make up the control unit.

When call unit 210 and view unit 230 are in the linked state, each of the components in call unit 210 and in view unit 230 are connected together by way of bus 250. When call unit 210 and view unit 230 are in the separated state, each of the components in call unit 210 are connected together by way of bus 250, and each of the components in view unit 230 are connected together by way of bus 250.

Display unit 211 is, for example, an LCD and displays images under the control of CPU 216 or CPU 237.

Microphone 212 outputs a voice signal of an input voice.

Speaker 213 reproduces an input voice signal.

Input unit 214 corresponds to input unit 132 in the first exemplary embodiment, and accepts the operation input from the user.

Communication IC 215 carries out short-range wireless communication such as Bluetooth (registered trademark) with view unit 230.

CPU 216 executes an application in accordance with input by way of input unit 214 or input unit 232 and carries out display control of images that correspond to the execution of the application.

RAM 217 temporarily stores, for example, data necessary for CPU 216 to carry out various processes.

ROM 218 stores, for example, a control program for CPU 216 to carry out various processes.

Display unit 231 is, for example, an LCD and displays images under the control of CPU 216 or CPU 237.

Input unit 232 corresponds to input unit 132 of the first exemplary embodiment and accepts the operation input from the user.

Sensor 233 monitors signals that change according to changes in the state of communication device 200.

State detection unit 234 detects the state of communication device 200 (whether call unit 210 and view unit 230 are in the separated state or the linked state, and further, when call unit 210 and view unit 230 are in the linked state, the closed/opened state of call unit 210 and view unit 230) based on the result of monitoring of sensor 233.

More specifically, sensor 233 monitors, for example, the transmission and receipt of signals between call unit 210 and view unit 230 by way of bus 250. When call unit 210 and view unit 230 are in the separated state, the transmission and receipt of signals between call unit 210 and view unit 230 by way of bus 250 are interrupted, and state detection unit 234 therefore detects whether call unit 210 and view unit 230 are in the separated state or linked state based on changes of these signals.

Alternatively, for example, a permanent magnet is disposed in either call unit 210 or view unit 230 and a Hall element is disposed in the other, and sensor 233 monitors the output voltage of the Hall element. Because the output voltage of a Hall element changes with changes in the opened/closed state of call unit 210 and view unit 230 due to the strength of the magnetic flux from the permanent magnet, state detection unit 234 detects the opened/closed state of call unit 210 and view unit 230 based on the change of the output voltage of this Hall element.

Communication IC 235 carries out short-range wireless communication with call unit 210.

Communication unit 236 is able to communicate by way of a network, and upon receiving input indicating that voice call is to be carried out, transmits a voice signal that is output from microphone 212 to the communication partner by way of the network, and further, inputs to speaker 213 the voice signal that is received from the communication partner by way of the network. The input and output of voice signals between communication unit 236 and microphone 212 and between communication unit 236 and speaker 213 are carried out by way of bus 250 when call unit 210 and view unit 230 are in the linked state and are carried out by way of short-range wireless communication when call unit 210 and view unit 230 are in the separated state.

CPU 237 together with CPU 216 execute an application in accordance with input by way of input unit 214 or input unit 232 and carry out display control of images that correspond to the execution of the application.

RAM 238 temporarily stores, for example, data necessary for CPU 237 to carry out various processes.

ROM 239 stores, for example, a control program for CPU 237 to carry out various processes.

Figure 4A:
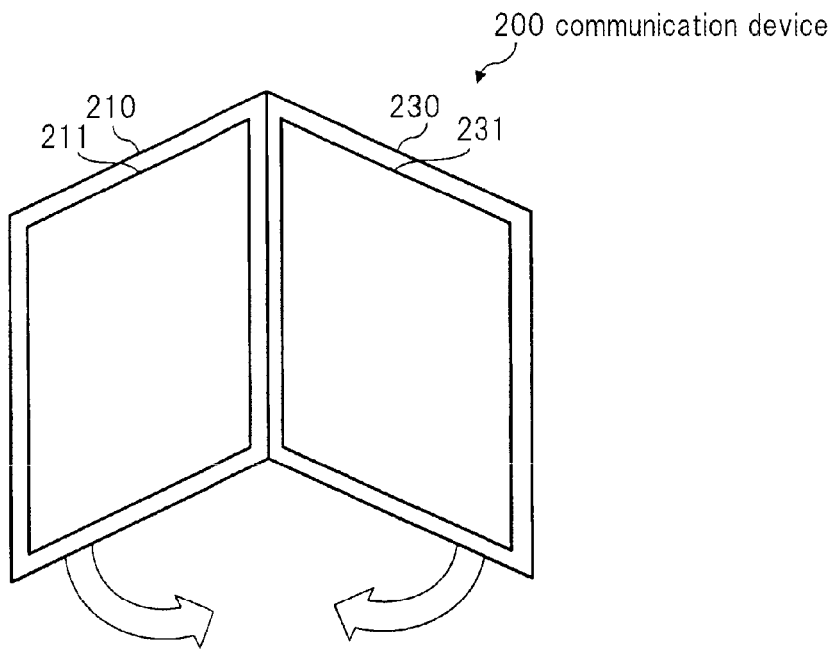
FIG. 4A shows the external appearance of the communication device shown in FIG. 3.
Figure 4B:
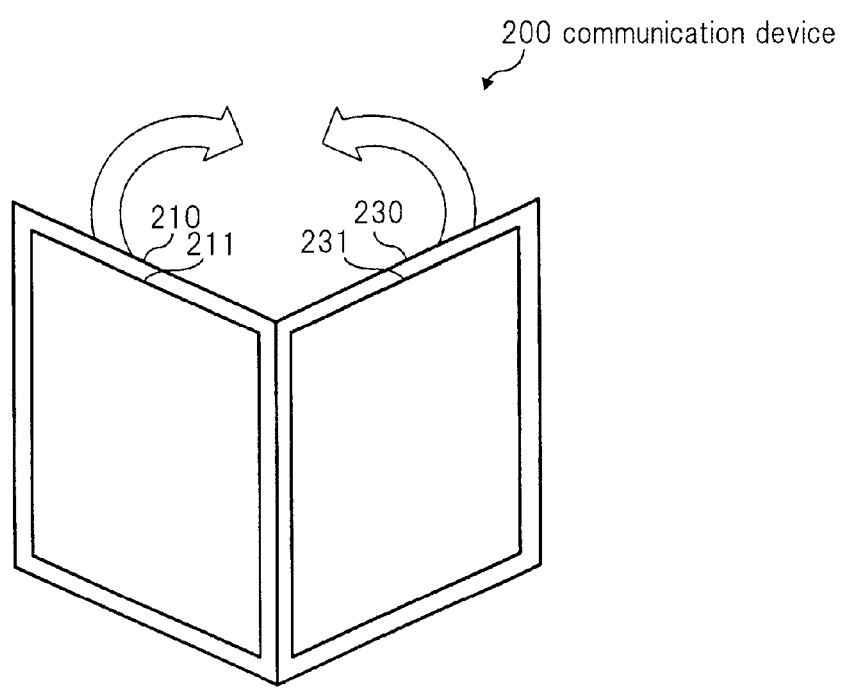
FIG. 4B shows the external appearance of the communication device shown in FIG. 3.

FIGS. 4A and 4B show the external appearance of communication device 200. In FIGS. 4A and 4B, only display unit 211 and display unit 231 are shown, and the description of other configuration is omitted.

Call unit 210 and view unit 230 are linked to allow opening and closing of substantially 360 degrees such that the inner sides of display unit 211 and display unit 231 face each other (FIG. 4A) or such that the outer sides of display unit 211 and display unit 231 face each other (FIG. 4B). In the following explanation, the state in which communication device 200 is folded such that the outer sides of display unit 211 and display unit 231 face each other (the angle formed by call unit 210 and view unit 230 is substantially 360 degrees) is referred to as the fully-opened state.

Call unit 210 is provided with microphone 212 and speaker 213 on the same surface as display unit 211. Microphone 212 is arranged so as to be positioned in the vicinity of the user's mouth in a state in which the user holds call unit 210 to carry out voice call, and speaker 213 is arranged so as to be positioned in the vicinity of the user's ear in a state in which the user holds call unit 210 to carry out voice call.

Communication device 200 is capable of voice call when call unit 210 and view unit 230 are in the separated state and in the fully-opened state.

Next, the operation of communication device 200 is described.

FIG. 5 is a flow chart showing the operation at the time of an incoming call of communication device 200.

Figure 6:
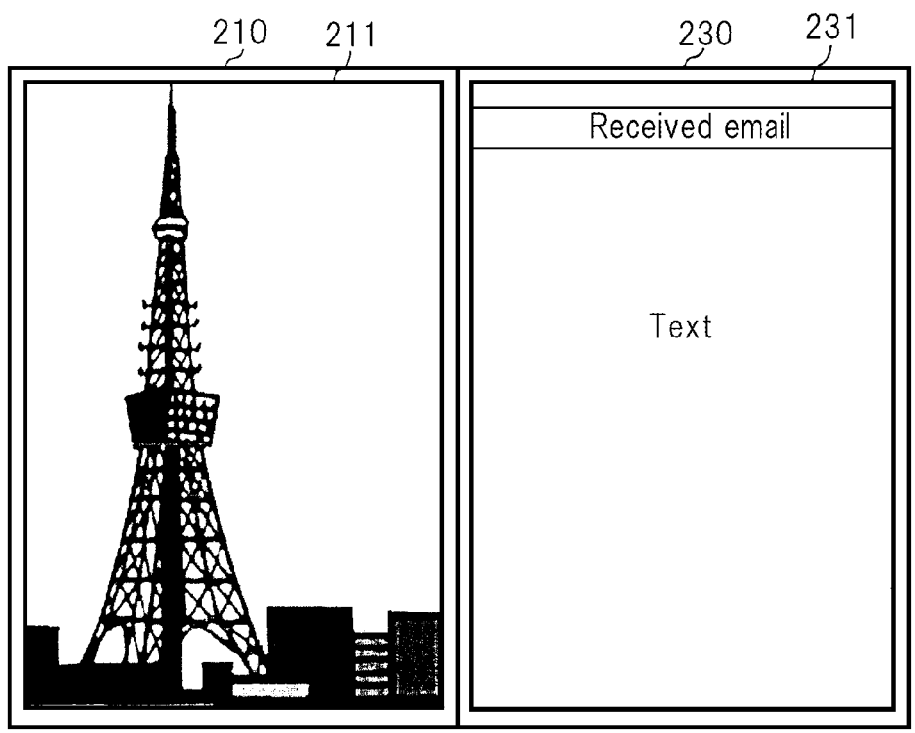
FIG. 6 shows an example of the display state of the display unit shown in FIG. 3.

In the following explanation, call unit 210 and view unit 230 are assumed to be in the linked state. In addition, input is assumed to have been received indicating the viewing of email and the viewing of a photograph, and, as shown in FIG. 6, an image is displayed on display unit 211 of call unit 210 that corresponds to the execution of a photograph-viewing application and an image is displayed on display unit 231 of view unit 230 that corresponds to an email application.

Upon incoming call, CPU 237 notifies CPU 216 by way of bus 250 of the incoming call (Step S501). Having received this notification, CPU 216 activates the call application (Step S502).

Next, CPU 237 activates communication IC 235, and CPU 216 activates communication IC 215 (Step S503). Communication IC 235 and communication IC 215 are thus able to perform short-range wireless communication.

Next, CPU 237 requests state detection unit 234 to detect the state of communication device 200, and based on the detection result of state detection unit 234, judges whether or not call unit 210 and view unit 230 are in the separated state, and further, whether or not call unit 210 and view unit 230 are in the fully-opened state (Step S504). When call unit 210 and view unit 230 are in neither the separated state nor the fully-opened state, CPU 237 repeats the process of Step 504.

When call unit 210 and view unit 230 are in the separated state, CPU 237, having received input indicating that voice call is to be carried out, notifies call unit 210 by way of communication IC 235 that voice call is to be started in a state in which call unit 210 and view unit 230 are in the separated state by way of communication IC 235. CPU 216, having received this notification, causes microphone 212 and speaker 213 to begin processing. In addition, CPU 237 causes communication unit 236 to begin transmitting and receiving voice signals by way of the network and to begin the input and output of voice signals with microphone 212 and speaker 213, thereby entering a call-enabled state (Step S505).

Next, as shown in FIG. 7, CPU 216 turns OFF the display of display unit 211 of call unit 210 (Step S506). In addition, CPU 237 causes display of images on display unit 231 of view unit 230 that correspond to the execution of an email application (Step S507). As described hereinabove, when the user carries out voice call, call unit 210 is held in a state in which microphone 212 is positioned in the vicinity of the user's mouth and speaker 213 is positioned in the vicinity of the user's ear, and in this state, the display of display unit 211 of call unit 210 is difficult for the user to see. In addition, because images that correspond to the execution of the application are displayed continuously on display unit 231, the user is unlikely to view the display of display unit 211 while carrying out voice call. As a result, turning OFF the display of display unit 211 enables a reduction of power consumption.

Although description was omitted in FIG. 6, when a plurality of applications are being executed when voice call is started, CPU 237 causes images that correspond to the execution of the application that was selected to be displayed on display unit 231. When input is received by way of input unit 232 indicating that any of the applications has been selected in accordance with the display of the selection image, CPU 237 causes the display on display unit 231 of images that correspond to the execution of the application that was selected. As a result, images that correspond to the execution of a photograph-viewing application that was being displayed on display unit 211 of call unit 210 before the start of call can be displayed on display unit 231 of view unit 230 during voice call.

When call unit 210 and view unit 230 are in the fully-opened state, CPU 237, having received input indicating that voice call is to be carried out, notifies call unit 210 that voice call is to be started in a state in which call unit 210 and view unit 230 are in the fully-opened state by way of bus 250. CPU 216, having received this notification, causes microphone 212 and speaker 213 to begin processing. In addition, CPU 237 causes communication unit 236 to begin transmitting and receiving voice signals by way of the network and to begin the input and output of voice signals with microphone 212 and speaker 213, whereby the call-enabled state is realized (Step S508).

In addition, CPU 237 turns OFF the display of display unit 231 or causes any image (such as an image indicating that voice call is in progress or an image that corresponds to the execution of an application) to be displayed on display unit 231 (Step S509).

CPU 216 turns OFF the display of display unit 211 (Step S510). As described hereinabove, when carrying out voice call, the user is unlikely to view the display of display unit 211 of call unit 210. As a result, turning OFF the display of display unit 211 of call unit 210 enables a decrease of power consumption.

FIG. 8 is a flow chart showing the operation at the time of outgoing call of communication device 200.

In the following explanation, call unit 210 and view unit 230 are assumed to be in the linked state.

CPU 237 periodically requests state detection unit 234 to detect the state of communication device 200 and judges based on the detection result of state detection unit 234 whether or not call unit 210 and view unit 230 are in the separated state or whether or not call unit 210 and view unit 230 are in the fully-opened state (Step S801).

When communication device 200 is in neither the separated state nor fully-opened state, CPU 237 repeats the process of Step S801.

When call unit 210 and view unit 230 are in the separated state, CPU 237 activates communication IC 235, and CPU 216 activates communication IC 215 (Step S802). CPU 216 monitors, for example, the input and output of signals between call unit 210 and view unit 230 by way of bus 250, and when the separation of call unit 210 and view unit 230 interrupts the input and output of signals by way of bus 250, judges that call unit 210 and view unit 230 have been separated and activates communication IC 215.

Next, CPU 216 activates a call application (Step S803).

Then, CPU 216 turns OFF display unit 211 of call unit 210 (Step S804). CPU 237 causes images that correspond to the execution of the application on display unit 231 of view unit 230 (Step S805) to be displayed. As a result, the user is able to see on display unit 231 of view unit 230 images that correspond to the execution of the application while holding call unit 210 for carrying out voice call.

Upon receiving input indicating that outgoing call is to be implemented, CPU 237 causes communication unit 236 to carry out an outgoing call.

When call unit 210 and view unit 230 are in the fully-opened state, CPU 237 causes images that correspond to the execution of the application on display unit 231 (Step S806) to be displayed.

CPU 237 notifies CPU 216 by way of bus 250 that call unit 210 and view unit 230 are in the fully-opened state (Step S807). Having received this notification, CPU 216 activates a call application (Step S808). In addition, CPU 216 turns OFF the display of display unit 211 (Step S809).

Subsequently, upon receiving input indicating that outgoing call is to be carried out, CPU 237 causes communication unit 236 to perform an outgoing call.

Thus, according to the present exemplary embodiment, communication device 200 is equipped with call unit 210 that includes display unit 211 and view unit 230 that includes display unit 231 and that is detachably attached to call unit 210; and when not carrying out voice call, displays images that correspond to the execution of an application on display unit 211 and display unit 231, and upon receiving input indicating that voice call is to be carried out, and moreover, when call unit 210 and view unit 230 are separated, displays images that correspond to the execution of the application on display unit 231.

As a result, when voice call is not carried out, images corresponding to the execution of an application are displayed by two display units, whereby more information can be more visibly displayed. In addition, when input is received that indicates that voice call is to be carried out, and moreover, when call unit 210 and view unit 230 are separated, images that correspond to the execution of the application are displayed on display unit 231 of view unit 230. By separating call unit 210 and view unit 230, the user is able to hold view unit 230 in a state in which the display of display unit 231 can be easily viewed, whereby the display of the display unit can be easily viewed even during voice call.

The method that is carried out in the communication device of the present invention may be applied to a program that is executed by a computer. In addition, this program can be stored on a recording medium, and further, can be provided to the outside by way of a network.

Although the invention of the present application has been described with reference to exemplary embodiments, the present invention is not limited to the above-described exemplary embodiments. The configuration and details of the invention of the present application are open to various modifications within the scope of the invention of the present application that will be clear to one of ordinary skill in the art.

The present application claims priority based on Japanese Patent Application No. 2012-138744 filed on Jun. 20, 2012, the entire content of which is incorporated herein by reference in its entirety.

The whole or part of the above-described exemplary embodiments disclosed above can be described as, but limited to, the following supplementary notes.

(Supplementary Note 1)

A communication device is equipped with a first unit and a second unit that is detachably attached to the first unit and that is able to communicate with the first unit;

the first unit being provided with at least a first display unit, a transmitter unit that outputs a voice signal of input voice, and a receiver unit that reproduces an input voice signal;

the second unit being provided with at least a second display unit;

the communication device comprising:

an input unit that accepts operation input;

a communication unit that, upon receiving input indicating that voice call is to be carried out, transmits a voice signal that is output by the transmitter unit to a communication partner by way of a network and inputs to the receiver unit a voice signal from the communication partner that is received by way of the network;

a detection unit that detects whether or not the first unit and the second unit are in a separated state; and a control unit that executes an application in accordance with input by way of the input unit, and when not carrying out voice call, displays images that correspond to the execution of the application on the first and second display units, and when having received input indicating that voice call is to be carried out, and moreover, when the detection result of the detection unit indicates that the first unit and the second unit are in the separated state, displays images that correspond to the execution of the application on the second display unit.

(Supplementary Note 2)

The communication according to Supplementary note 1, wherein:

when input is received that indicates that voice call is to be carried out, and moreover, when the first unit and the second unit are in the separated state, the control unit turns OFF the display of the first display unit.

(Supplementary Note 3)

The communication device according to Supplementary note 1 or 2, wherein:

when input is received that indicates that voice call is to be carried out in a state in which a plurality of applications are being executed, and moreover, when the first unit and the second unit are in the separated state, the control unit causes display on the second display unit of a selection image that indicates a request to select any of the plurality of applications that are being executed, and upon receiving input indicating the selection of any application in accordance with the display of the selection image, causes images that correspond to the execution of the application that was selected on the second display unit to be displayed.

(Supplementary Note 4)

The communication device according to any one of Supplementary notes 1 to 3, wherein:

the first unit and the second unit are linked in a linked state that can be opened or closed, the detection unit further detects the opened/closed state of the first unit and second unit; and when input is received indicating that voice call is to be carried out, and moreover, when the detection result of the detection unit indicates that the first unit and the second unit are in a predetermined opened/closed state, the control unit causes voice call to start and turns OFF the display of the first display unit.

(Supplementary Note 5)

A control method of a communication device that is equipped with a first unit that is provided with at least a first display unit, a transmitter unit that outputs a voice signal of input voice, and a receiver unit that reproduces an input voice signal and a second unit that is provided with at least a second display unit, that is detachably attached to the first unit, and that is able to communicate with the first unit; comprising:

upon receiving input indicating that voice call is to be carried out, transmitting a voice signal that is output from the transmitter unit to a communication partner by way of a network and inputting to the receiver unit a voice signal from the communication partner that is received by way of the network;

detecting whether or not the first unit and the second unit are in a separated state; and executing an application in accordance with operation input, and when not carrying out voice call, displaying images that correspond to the execution of the application on the first and second display units, and upon receiving input indicating that voice call is to be carried out, and moreover, when the first unit and the second unit are in the separated state, displaying images that correspond to the execution of the application on the second display unit.

(Supplementary Note 6)

The control method of a communication device according to Supplementary note 5, wherein:

when input has been received that voice call is to be carried out, and moreover, when the first unit and the second unit are in a separated state, the display of the first display unit is turned OFF.

(Supplementary Note 7)

The control method of the communication device according to Supplementary note 5 or 6, wherein:

When input is received indicating that voice call is to be carried out in a state in which a plurality of applications are being executed, and moreover, when the first unit and the second unit are in the separated state, a selection image indicating a request for the selection of any of the plurality of applications that are being executed is displayed on the second display unit, and upon receiving input of the selection of any of the applications in accordance with the display of the selection image, images that correspond to the execution of the application that was selected are displayed on the second display unit.

(Supplementary Note 8)

The control method of the communication device according to any one of Supplementary notes 5 to 7, wherein:

when the first unit and the second unit are linked in a linked state that can be opened and closed, the opened/closed state of the first unit and the second unit is further detected; and when input is received indicating that voice call is to be carried out, and moreover, when the first unit and the second unit are in a predetermined opened/closed state, the display of the first display unit is turned OFF, and further, voice call is started.

(Supplementary Note 9)

A program for causing a computer in a communication device, which is equipped with a first unit that is provided with at least a first display unit, a transmitter unit that outputs a voice signal of input voice, and a receiver unit that reproduces an input voice signal and a second unit that is provided with at least a second display unit, that is detachably attached to the first unit, and that is able to communicate with the first unit, to execute:

a process of, upon receiving input indicating that voice call is to be carried out, transmitting a voice signal that is output from the transmitter unit to a communication partner by way of a network and inputting to the receiver unit a voice signal from the communication partner that is received by way of the network;

a process of detecting whether or not the first unit and the second unit are in a separated state; and a process of executing an application in accordance with operation input, and when not carrying out voice call, displaying images that correspond to the execution of the application on the first and second display units, and when input is received indicating that voice call is to be carried out, and moreover, when the first unit and the second unit are in a separated state, displaying images that correspond to the execution of the application on the second display unit.

The invention claimed is:
1. A communication device comprising:
a first unit provided with at least a first display unit, a transmitter unit that outputs a voice signal of input voice, and a receiver unit that reproduces an input voice signal; and
a second unit that is detachably attached to said first unit and that is able to communicate with said first unit, said second unit being provided with at least a second display unit;
an input unit that accepts operation input;
a communication unit that, upon receiving input indicating that a voice call is to be carried out, transmits a voice signal that is output by said transmitter unit to a communication partner by a network and applies as input to said receiver unit a voice signal from said communication partner that is received by said network;
a detection unit that detects whether or not said first unit and second unit are in a separated state; and
a control unit that executes an application in accordance with the input by said input unit, and when not carrying out the voice call, displays images that correspond to the execution of said application on said first and second display units, and when the input is received indicating that voice call is to be carried out, and moreover, when the detection result of said detection unit indicates that said first unit and second unit are in the separated state, displays images that correspond to the execution of said application on said second display unit,
wherein when the input is received that indicates that the voice call is to be carried out in a state in which a plurality of applications are being executed, and moreover, when said first unit and second unit are in the separated state, said control unit causes display on said second display unit of a selection image that indicates a request to select any of said plurality of applications that are being executed, and upon receiving an input indicating selection of any application in accordance with the display of the selection image, causes images that correspond to the execution of said application that was selected on said second display unit to be displayed.

2. The communication device according to claim 1, wherein:
when the input is received that indicates that the voice call is to be carried out, and moreover, when said first unit and second unit are in the separated state, said control unit turns OFF the display of said first display unit.

3. The communication device according to claim 1, wherein:
said first unit and second unit are linked in a linked state that can be opened or closed;
said detection unit further detects the opened/closed state of said first unit and second unit; and
when the input is received indicating that the voice call is to be carried out, and moreover, when the detection result of said detection unit indicates that said first unit and second unit are in a predetermined opened/closed state, said control unit causes the voice call to start and turns OFF the display of said first display unit.

4. A control method of a communication device that is equipped with a first unit that is provided with at least a first display unit, a transmitter unit that outputs a voice signal of input voice, and a receiver unit that reproduces an input voice signal and a second unit that is provided with at least a second display unit, that is detachably attached to said first unit, and that is able to communicate with said first unit, the method comprising:
upon receiving input indicating that a voice call is to be carried out, transmitting a voice signal that is output from said transmitter unit to a communication partner by of a network and inputting to said receiver unit a voice signal from said communication partner that is received by said network;
detecting whether or not said first unit and second unit are in a separated state; and
executing an application in accordance with operation input, and when not carrying out the voice call, displaying images that correspond to the execution of said application on said first and second display units, and upon receiving input indicating that voice call is to be carried out, and moreover, when said first unit and second unit are in a separated state, displaying images that correspond to the execution of said application on said second display unit; and
when the input indicates that the voice call is to be carried out in a state in which a plurality of applications are being executed, and moreover, when said first unit and second unit are in the separated state, displaying on said second display unit a selection image that indicates a request to select any of said plurality of applications that are being executed, and upon receiving an input indicating selection of any application in accordance with the display of the selection image, displaying images that correspond to the execution of said application that was selected on said second display unit.

5. A non-transitory computer-readable recording medium having recorded therein a program for causing a computer in a communication device, which is equipped with a first unit that is provided with at least a first display unit, a transmitter unit that outputs a voice signal of input voice, and a receiver unit that reproduces an input voice signal and a second unit that is provided with at least a second display unit, that is detachably attached to said first unit, and that is able to communicate with said first unit, to execute:
a process of, upon receiving input indicating that a voice call is to be carried out, transmitting a voice signal that is output from said transmitter unit to a communication partner by a network and inputting to said receiver unit a voice signal from said communication partner that is received by said network;
a process of detecting whether or not said first unit and second unit are in a separated state;
a process of executing an application in accordance with operation input, and when not carrying out the voice call, displaying images that correspond to the execution of said application on said first and second display units, and when input is received indicating that voice call is to be carried out, and moreover, when said first unit and second unit are in a separated state, displaying images that correspond to the execution of said application on said second display unit; and
when the input indicates that the voice call is to be carried out in a state in which a plurality of applications are being executed, and moreover, when said first unit and second unit are in the separated state, a process of displaying on said second display unit a selection image that indicates a request to select any of said plurality of applications that are being executed, and upon receiving an input indicating selection of any application in accordance with the display of the selection image, a process of displaying images that correspond to the execution of said application that was selected on said second display unit.

6. The communication device according to claim 2, wherein:

said first unit and second unit are linked in a linked state that can be opened or closed;

said detection unit further detects the opened/closed state of said first unit and second unit; and when the input is received indicating that the voice call is to be carried out, and moreover, when the detection result of said detection unit indicates that said first unit and second unit are in a predetermined opened/closed state, said control unit causes the voice call to start and turns OFF the display of said first display unit.

* * * * *